United States Patent [19]

Rudd

[11] Patent Number: 4,508,949

[45] Date of Patent: Apr. 2, 1985

[54] METHOD AND APPARATUS FOR WELDING TAPERED METAL POLES

[75] Inventor: Wallace C. Rudd, New Canaan, Conn.

[73] Assignee: Thermatool Corporation, Stamford, Conn.

[21] Appl. No.: 429,099

[22] Filed: Sep. 30, 1982

[51] Int. Cl.³ .............................................. B23K 11/32
[52] U.S. Cl. ................................. 219/61.2; 219/61.11; 219/61.13; 219/61.3; 219/67
[58] Field of Search ............... 219/8.5, 59.1, 61.1, 219/61.11, 61.13, 61.2, 61.3, 67

[56] References Cited

U.S. PATENT DOCUMENTS

| | | | |
|---|---|---|---|
| 2,629,806 | 2/1953 | Anderson | 219/59.1 |
| 3,234,352 | 2/1966 | Morris et al. | 219/61.13 |
| 3,648,008 | 3/1972 | Kawato et al. | 219/61.2 |

FOREIGN PATENT DOCUMENTS 33866  3/1980  Japan ................................. 219/59.1

*Primary Examiner*—Roy N. Envall, Jr.
*Assistant Examiner*—Alfred S. Keve
*Attorney, Agent, or Firm*—Brooks Haidt Haffner & Delahunty

[57] ABSTRACT

Methods and apparatus for manufacturing tapered, hollow metal poles which can be used for manufacturing poles of various lengths, tapers and cross-sectional dimensions with the same apparatus. A substantially complete, tapered tube is formed from a plate or sheet of metal having lips at its longitudinal side edges which extend transversely to the major surface of the plate or sheet. The tube is guided at its lip portions to a weld point where pressure is applied to force the lips together by a grooved roller which applies pressure to the oppositely facing surfaces of the lips in directions transverse to such surfaces. The lips are spaced in advance of the weld point, and high frequency, electric heating current is supplied to the tube at opposite sides of the gap between the lips to heat the tube at the lips to welding temperature as it is advanced to the weld point.

17 Claims, 12 Drawing Figures

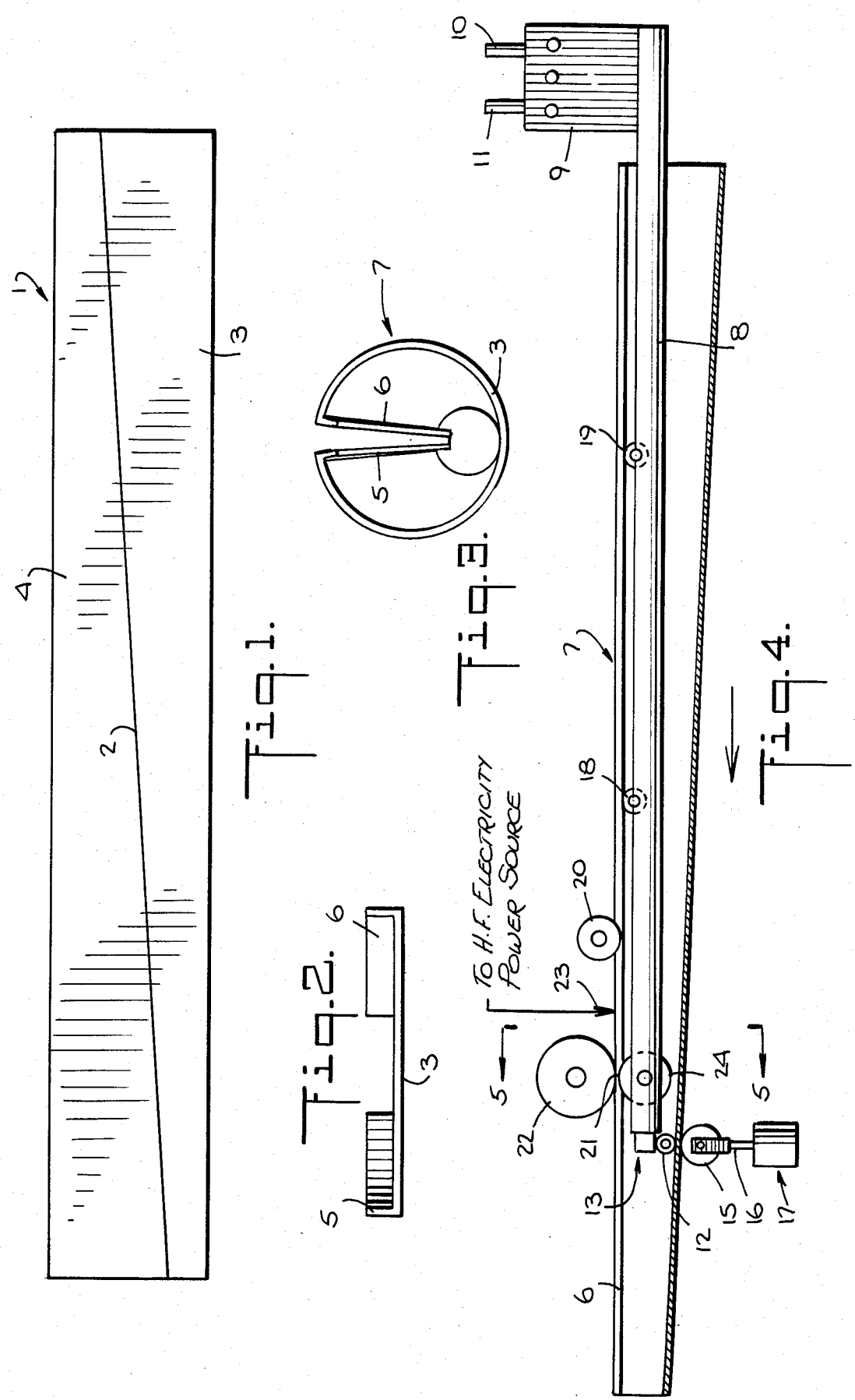

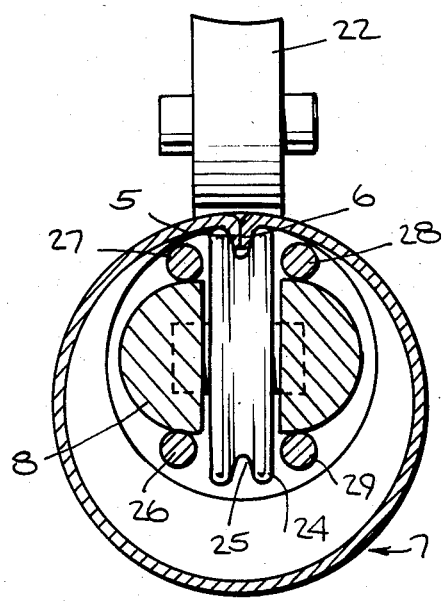
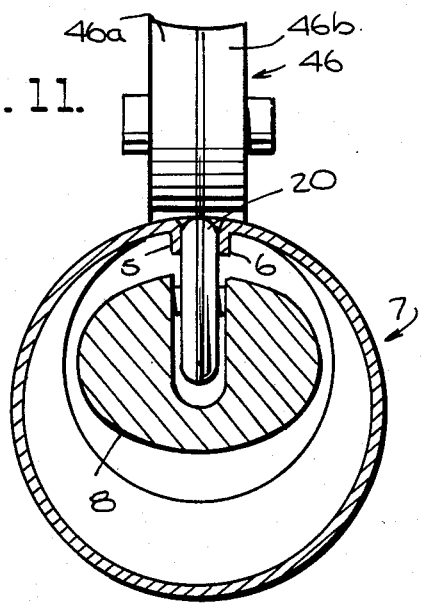
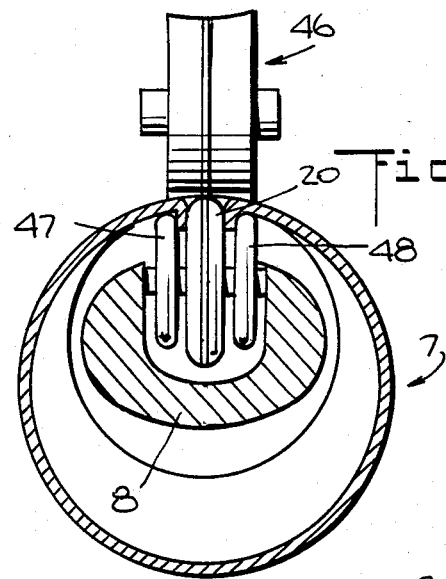
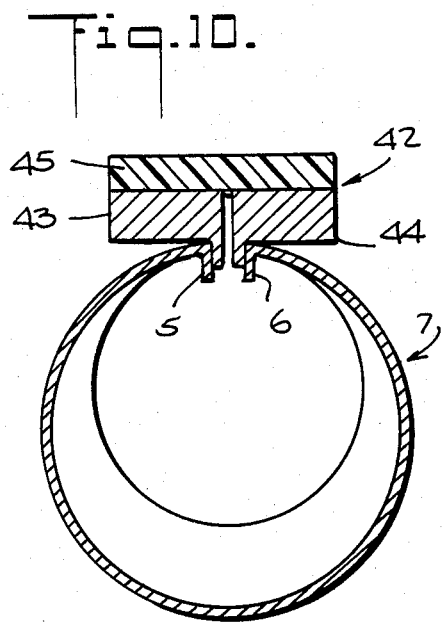
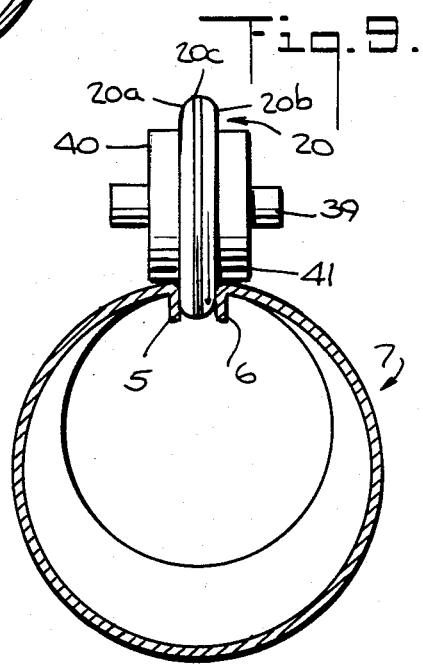

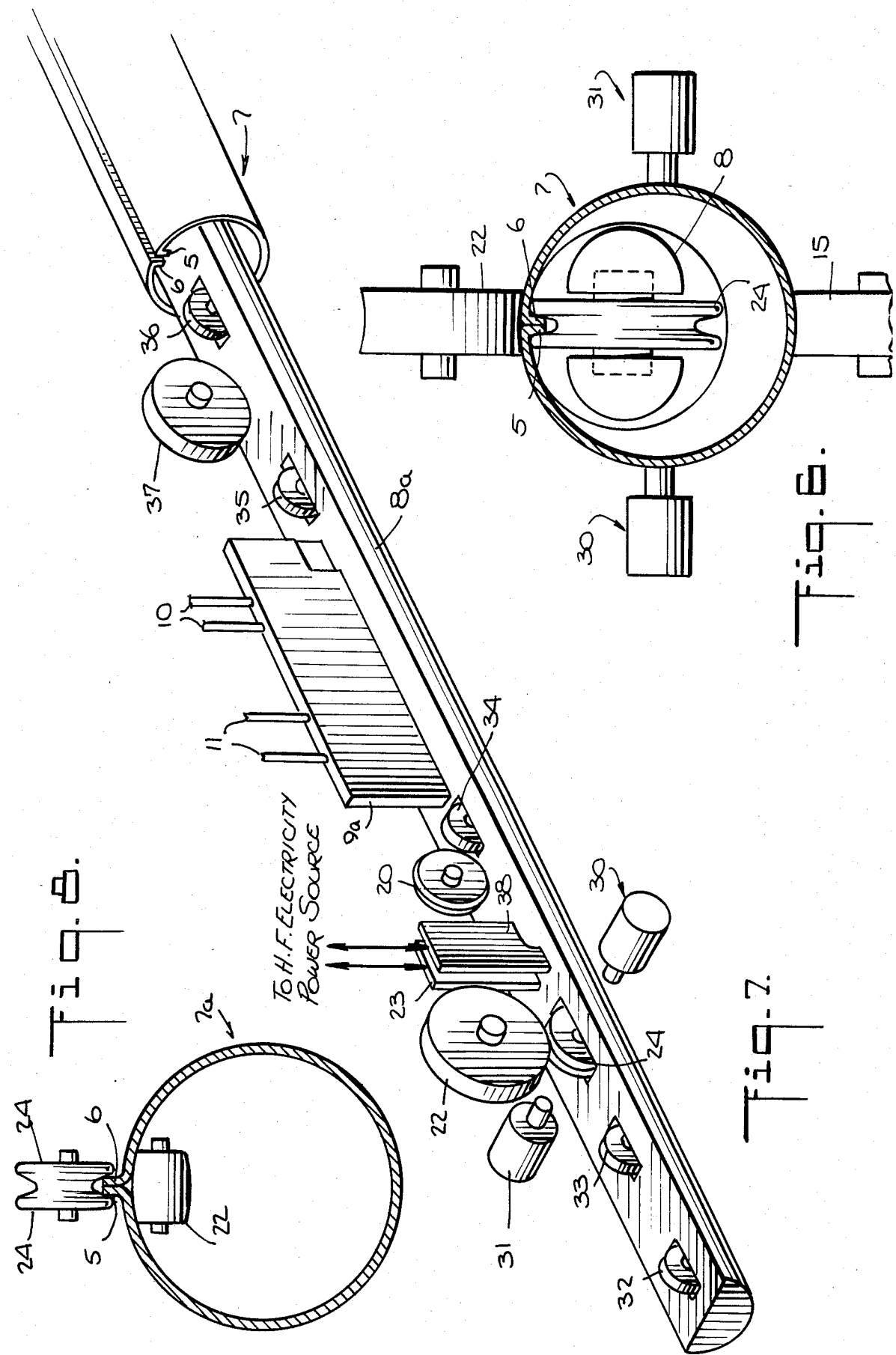

METHOD AND APPARATUS FOR WELDING TAPERED METAL POLES

This invention relates to the manufacture of hollow, tapered metal poles and particularly, to methods of manufacturing such poles from metal plates or sheets involving the use of electrical welding.

It is known in the art to manufacture hollow, tapered metal poles or posts, such as lamp poles or posts, by mechanically forming a metal plate or sheet into a tapered, tubular shape and then welding the edge portions of the plate or sheet by electrical welding methods, e.g. high frequency, electrical welding methods well known in the art. However, none of the known methods are simple and efficient in operation, and substantial apparatus changes are required whenever poles or posts of different lengths, diameters or shapes are to be manufactured. For example, one method in commercial use employes squeeze rolls nineteen feet in diameter and shaped blanks are used to change the periphery of the squeeze rolls to accommodate different pole lengths, diameters or shapes.

One object of the invention is to simplify and reduce the size of the apparatus required to make hollow, tapered metal poles or posts.

Another object of the invention is to provide methods and apparatus for the manufacture of hollow, tapered, metal poles or posts which can be used to make such poles or posts of different lengths, diameters or shapes without requiring substantial readjustment or modification of the apparatus for each pole or post length, diameter or shape.

In accordance with the invention, a metal plate or sheet having a tapered width is provided with lips at its edges by bending the plate or sheet adjacent its edges and forming such plate or sheet into a tapered substantially complete the with the lips adjacent each other. The lips are pressed together at a weld point while the tube is advanced and in advance of the weld point electric current, preferably, high frequency current, having a frequency of at least 3000 Hz is supplied to the tube adjacent the spaced lips, preferably, by means of contacts engaging the tube at or adjacent to the lips. The lips are maintained at a constant level as the tube is advanced which means that the apparatus need not be changed when poles or posts of different shapes or diameters are made. The arrangement of the apparatus is such that poles of any conventional length can be made with the same apparatus. An important feature of the invention is that the nearly completely formed tube is closed by pressure applied to the lips rather than by pressure applied to the peripheral portions of the tube spaced from the lips making it unnecessary to change pressure rolls with changes in pole shape or diameter.

Other objects and advantages of the present invention will be apparent from the following detailed description of the presently preferred embodiments thereof, which description should be considered in conjunction with the accompanying drawings in which:

FIG. 1 is a plan view of a plate or sheet (hereinafter called a "sheet") illustrating the cutting thereof to form two blanks of tapered width for making two poles or posts (hereinafter called "poles");

FIG. 2 is an enlarged, end view of one of the blanks shown in FIG. 1 after lips have been formed at the edges thereof by bending edge portions of the blank;

FIG. 3 is an end view of a blank after it has been formed into a substantially complete tube;

FIG. 4 is a diagrammatic, side elevation view of one embodiment of the apparatus for welding the tube of FIG. 3 at the lips, the tube being welded being shown in cross-section;

FIG. 5 is a cross-sectional view taken along the line 5—5 in FIG. 4, with parts omitted for simplicity, illustrating one form of mandrel and pressure rolls which may be used at the weld point;

FIG. 6 is a cross-sectional view, similar to FIG. 5, illustrating a mandrel without impeders and with supplementary advances for applying pressure to a tube at the start of the welding thereof.

FIG. 7 is an isometric view of a modified embodiment of the apparatus for welding the tube;

FIG. 8 is a fragmentary, cross-sectional view, similar to FIG. 5, illustrating the welding of a tube with the lips exteriorly of the tube; and FIGS. 9–12 are cross-sectional views of various seam guides which may be used with the apparatus for welding the tube.

In the preferred method of the invention, a rectangular metal sheet 1, illustrated in FIG. 1, is cut along a line 2 to provide two blanks 3 and 4 for making two tapered poles. The metal of the sheet 1 may be any weldable metal and may, for example, be aluminum, carbon steel or stainless steel. The dimensions of the sheet 1 and of the two blanks 3 and 4 are selected in the obvious manner so that the completed poles will have the desired lengths, diameters and tapers. The minimum diameter of a pole, at its smallest diameter end, which can be made is determined by the size of the apparatus, hereinafter described, which is within the tube as it is welded. The size of such apparatus is determined by mechanical considerations, such as strength. Typically, a very small diameter pole has a minimum diameter of four inches, but when the blanks 3 and 4 are relatively thin, poles of smaller diameter can be made with apparatus of the invention.

After the blanks 3 and 4 are formed, edge portions thereof are bent away from the plane of the surface of the blank to form lips 5 and 6, FIG. 2 illustrating one of the blanks 3 after the lips are formed. Preferably, the height of the lips 5 and 6 above the upper surface of the blank 3, as viewed in FIG. 2, is at least twice the thickness of the blank 3.

Thereafter, the blank 3 with the lips 5 and 6 are formed, in a conventional manner, into a substantially completed tube 7 with the lips 5 and 6 in adjacent, spaced relation and extending generally radially of the axis of the tube as illustrated in FIG. 3. FIG. 3 illustrates a tube 7 having a substantially circular cross-section at any point along its length, but it will be apparent that the blank 3 may be shaped, in a conventional manner, to have other cross-sections, such as square, octagonal, hexagonal, etc.

One embodiment of apparatus for welding the tube 7 shown in FIG. 3 is illustrated diagrammatically in FIG. 4. Such apparatus comprises a mandrel 8 held in a fixed position by a plate 9 thin enough to be received between the spaced lips 5 and 6 and secured to a fixed support (not shown). Water for cooling the mandrel 8 may be supplied to the mandrel 8 by way of tubes 10 and 11 communicating with passageways in the plate 9 and the mandrel 8.

If it is necessary to do so, the mandrel 8 may be supported at its free end by a roller 12 which is mounted on the piston rod of a hydraulic piston and cylinder assembly 13, the cylinder of which is secured to the free end of the mandrel 8. The roller 12 rides on the inside surface of the tube 7, and if the difference between the smallest and largest diameters of the tube 7 is sufficiently great, and bearing in mind that the piston and cylinder assembly 12 must fit inside the smallest diameter end of the tube 7, it may be necessary to provide known mechanical devices, such as lever amplification of the piston rod movement or multiple sleeve pistons, to provide sufficient movement of the roller 12 in relation to the mandrel 8 to keep the roller on the inner surface of the tube 7.

The tube 7 is supported below the roller 12 by a roller 15 mounted on the piston rod 16 of a hydraulic piston and cylinder assembly 17 mounted on a fixed support (not shown). The roller 15 engages the exterior surface of the tube 7 below the roller 12. As the tube 7 is advanced from right to left, as viewed in FIG. 4, the roller 12 is moved downwardly by the assembly 13 to keep the roller 12 in contact with the inner surface of the tube 7, and the assembly 17 permits the roller 15 to move downwardly so that both roller 12 and roller 15 move in accordance with the change in the tube 7 and the free end of the mandrel 8 is supported during the advances of the tube 7 during the welding process.

The mandrel 8 carries a pair of rollers 18 and 19 for supporting the tube 7 at the lips 5 and 6. A seam guide 20, in the form of a roller mounted on a fixed support, is between, and bears against, the lips 5 and 6 to maintain them in properly spaced relation from the guide 20 to the weld point 21 which is below a squeeze roller 22 which is pressed against the tube 7 by any conventional means (not shown), such as a piston and cylinder assembly. The roller 22 applies pressure to the tube 7 which is directed generally parallel to the height direction of the lips 5 and 6 and toward the axis of the tube 7. As the tube 7 is advanced, such as by driving the roller 22, a draw bench or a chain, finger rotary system alongside the tube 7, high frequency heating current is supplied to the portions of the tube 7 at the lips 5 and 6 by contacts respectively engaging the tube 7 at opposite sides of the gap between the lips 5 and 6, one such contact being shown diagrammatically at 23.

As the tube 7 is advanced, the lips 5 and 6 are squeezed together at the weld point 21 by pressure applied to the oppositely facing surfaces thereof and in a direction transverse to said surfaces. Although such pressure may be applied thereto by a pair of rollers mounted on the mandrel 8 below the roller 22, the peripheries of such rollers respectively engaging the oppositely facing surfaces of the lips 5 and 6, space limitations may be such that the bearing system for such rollers would be inadequate for the squeeze pressures involved. For this reason, it is preferred to use a grooved roller 24, mounted on the mandrel 8, at the weld point 21, a preferred type of roller 24 being illustrated in FIG. 5.

The roller 24 illustrated in FIG. 5 has a wedge-shaped or V-shaped peripheral groove 25 which is wide enough at its outer diameter to receive the lips 5 and 6 but which is narrow enough, at least at the diameter reached by the lips 5 and 6 when the lips 5 and 6 are fully inserted into the groove 25, to apply the desired pressure, e.g. forge welding pressure, to the lips 5 and 6. Thus, as the lips 5 and 6 pass through the groove 25, they are squeezed together, and the tube 7 is pressed downwardly, as viewed in FIG. 5, by the roller 22 so that portions of the tube 7, at the lips 5 and 6 which have been heated to welding temperature by the high frequency current by the time they reach the weld point 21, are welded together.

With the apparatus and method described, it is possible to produce a pole with a weld seam which is practically invisible and scarfing of the weld metal is not required. However, if desired, the pole may be scarfed or ground at the weld seam to improve the appearance thereof in the event that such scarfing or grinding is desired.

It will also be noted that in addition to providing means for squeezing the edge portions of the tube 7 together, the lips 5 and 6 act as a stiffener for the resulting pole.

FIG. 5 also illustrates rods 26–29 of a magnetic material, such as ferrite rods known in the art as impeders, which may be employed, if necessary, to concentrate the heating current in the area of the lips 5 and 6. When the tube 7 has a relatively large diameter, such rods 26–29 may be omitted because the impedance of the tube 7 around the inside thereof, from contact to contact, will be relatively large and the undesired current flow around the inside of the tube 7 will be relatively small. However, if the diameter of the tube 7 is relatively small, e.g. four inches or less at the smallest diameter end, such rods 26–29 may be used for their known effect of reducing the current flow around the inside of the tube 7. Fewer than four rods 26–29 may be used, and rods in the positions of the rods 27 and 28 will have the greatest effect on the current flow around the inside of the tube 7 and have substantially constant spacing with respect to the tube 7 as it is advanced.

With small diameter tubes, the current around the tube 7, from contact to contact, may vary significantly as the tube 7 is advanced because of the variation of the tube diameter. Such variation in such current could affect the amount of heating current along the lips 5 and 6 and hence, the heating of the metal at the lips 5 and 6. However, such variation can be kept to an insignificant amount by employing well known speed-power control equipment which controls the heating current in such a way as to cause the heating current at the lips 5 and 6 to be substantially constant for a given speed of advance.

When the tube 7 has a relatively large thickness, e.g. three-eighths inch or more, the rollers 22 and 24 may not supply sufficient force to press the lips 5 and 6 together when a tube 7 is first placed in the apparatus. For example, when the tube 7 is first placed in the apparatus it is relatively cold, and therefore, it is difficult to press the lips 5 and 6 into the groove 25 of the roller 24, and the roller 22 may not provide sufficient force to press the lips 5 and 6 into the groove and thereby press the lips 5 and 6 together. In addition, as the leading end of the tube 7 is advanced to the rollers 22 and 25, the lips 5 and 6 normally will be spaced from each other. In such event, additional force to press the lips 5 and 6 together may be supplied by a pair of hydraulic piston and cylinder assemblies 30 and 31 as illustrated in FIG. 6. Thus, the roller 22 may be raised and the portions of the lips 5 and 6 at the leading end of the tube 7 may be placed over the roller 24 and pressure may be applied to the tube 7 by the assemblies 30 and 31 to press the lips 5 and 6 into contact. The roller 22 may then be lowered with normal pressure applied thereto, and the piston rods of the assemblies 30 and 31 may be retracted. The tube 7 is then ready to be advanced and welded.

It will be observed that the line of cut 2 (FIG. 1) is longer than the opposite, uncut edges of the blanks 3 and 4 which means that when the lips 5 and 6 are brought together, the lips will not be coterminous. Also, with the apparatus described, portions of the lips 5 and 6, on the order of one-half inch at the leading end of the tube 7 and on the order of a few inches at the trailing end of the tube 7, will not be welded together. Such imperfections may be removed after the pole is welded by cutting such portions away while at the same time causing the ends of the pole to be in planes perpendicular to the axis of the pole. Of course, if the waste of metal can be tolerated, the lips 5 and 6 may be made coterminous before the tube 7 is welded by cutting the blank 3 or 4 from metal sheet in such a way that the longitudinal side edges have the same length.

When the smallest inside diameter of a pole to be manufactured is about four inches, it is possible to make the mandrel 8 of a size and to locate the support therefor such that the supporting devices 13 and 17 shown in FIG. 4 may be eliminated. Thus, as shown in FIG. 7, the support 9a for the mandrel 8a may be located close to the seam guide 20, and in the case of a four inch inside diameter pole, the radius of the mandrel 8a may be one-and-one-half inches. The mandrel 8a carries a plurality of tube support rollers 32-36 for supporting the tube 7 at its lips 5 and 6. A guide roller 37, adjustably mounted on a fixed support (not shown), holds the tube 7 on the rollers 35 and 36. FIG. 7 illustrates the other contact 38 of the two contacts for contacting the tube 7 and supplying electrical heating current thereto.

The operation of the apparatus shown in FIG. 7 is the same as the operation of the apparatus described in connection with FIG. 4.

In the embodiments previously described the lips 5 and 6 are disposed interiorly of the tube 7. If lips projecting from the exterior surface of the pole are acceptable, the invention may be employed to manufacture such poles. As illustrated in FIG. 8, the tube 7a is formed as previously described but with the lips 5 and 6 extending outwardly. In the apparatus used for welding the tube 7a, the squeeze roller 22 and the grooved roller 24 are interchanged in the apparatus previously described. Thus, the squeeze roller 22, which may not be necessary if the wall of the tube 7a is thick enough, is mounted on the mandrel 8 or 8a, and the grooved roller 24, for pressing the lips 5 and 6 together, may be mounted on the pressure applying means on which the squeeze roller 22 is mounted in the apparatus of FIGS. 4 and 7. Otherwise, the welding of the tube 7a is accomplished as described hereinbefore.

The seam guide 20 illustrated in FIGS. 4 and 7 comprises three parts, a pair of outer metal parts 20a and 20b (see FIG. 9) separated by a disc 30c of insulating material 20c, the disc 20c being present to make the roller non-conductive in the direction between its side faces and thereby to prevent shunting of the heating current through the seam guide 20. For this purpose, the roller 20 may be mounted on an axle 39 of insulating material or the axle 39 may be made of metal and the parts 20a and 20b may be insulated with respect to the axle 39.

To assist in guiding the tube 7, the seam guide 20 may be provided with a pair of collars 40 and 41 rotatable with the guide 20. The collars may be made of insulating material or be insulated from each other as described in connection with the parts 20a and 20b.

In place of the seam guide 20, the conventional seam guide 42 illustrated in FIG. 10 may be used. The guide 42 comprises a pair of carbide blocks 43 and 44 mounted on a mount 45 of insulating material.

An alternative arrangement for maintaining the lips 5 and 6 in properly spaced relation in advance of the weld points is illustrated in FIG. 11. In this arrangement, the roller 20 is mounted on the mandrel 8, or the mandrel 8a, and a further guide roller 46, which is optional, is adjustably mounted on a fixed support (not shown). The parts 46a and 46b of the roller 46 are insulated from each other in the manner described in connection with the roller 20 to make it non-conductive in the direction between its side faces.

A preferred arrangement for guiding the lips 5 and 6 of the tube 7 as the tube 7 is advanced is illustrated in FIG. 12. The embodiment shown in FIG. 12 differs from the embodiment shown in FIG. 11 by the addition of a pair of rotatable rollers or disc wheels 47 and 48 insulated from each other and spaced from the roller 20 by an amount substantially equal to the thickness of the lips 5 and 6. The roller 46 may be omitted if not required to hold the lips 5 and 6 in their correct positions.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A method for manufacturing a tapered metal pole, said method comprising:

forming a substantially complete tube from a sheet of metal, said tube having adjacent lips at the edge portions of said sheet which extend generally radially of the axis of said tube and having a cross-section which varies in size in the direction of its length;

advancing said tube lengthwise thereof to bring said lips to a weld point with said lips in spaced apart relation in advance of said weld point;

guiding said lips to the weld point by supporting said tube interiorly of said tube at the weld point and at the portion of the tube having said lips as the tube is advanced to the weld point;

in advance of said weld point and where the lips are in spaced apart relation, supplying high frequency, electrical heating current to said tube by contacts to bring the lips to welding temperature by the time they reach the weld point, one of said contacts engaging said tube at or adjacent one of said lips and the other of said contacts engaging said tube at or adjacent the other of said lips; and bringing said lips into contact and welding them together by pressing said lips together at said weld point by applying pressure to the oppositely facing surfaces of said lips which is directed transversely to said surfaces.

2. A method as set forth in claim 1 wherein said pressure is applied to said lips by forcing said lips into the groove of means having a V-shaped groove therein.

3. A method as set forth in claim 1 further comprising applying pressure to said tube at said weld point which is directed toward the axis of said tube.

4. A method as set forth in claim 1 or 2 wherein said tube is advanced with said lips following a path which is parallel to the portions of the wall of the tube from which the lips extend, said path extending at an acute angle to the axis of said tube.

5. A method as set forth in claim 1 wherein said tube is formed prior to welding by cutting a relatively long blank from a metal sheet, said blank having a tapering width in the direction of its length, bending the longitudinal edge portions of said blank to form lips extending transversely to the major surface of the blank and bending the blank around its longitudinal center to bring said lips into side-by-side, spaced relation.

6. A method as set forth in claim 5 wherein the height of said lips above a major surface of said blank is at least twice the thickness of the metal of said blank.

7. Apparatus for the welding of a longitudinally advanced, tapered tube to form a hollow, tapered pole having a longitudinally extending weld seam, said tube having a pair of lips which extend longitudinally of said tube and radially of the axis of the tube, said apparatus comprising:
pressure applying means defining a weld point and including means for engaging the oppositely facing surfaces of said lips and pressing the lips toward each other;
seam guide means in advance of said weld point for maintaining said lips in spaced relation in advance of said weld point to thereby provide a gap therebetween;
a pair of contact means for supplying high frequency, electrical, heating current to said tube, said contact means being intermediate said seam guide means and said weld point and each of said contact means being respectively engageable with a portion of said tube having a lip and at opposite sides of said gap; and
support means for supporting said tube interiorly thereof at the portions thereof having said lips as said tube is advanced.

8. Apparatus as set forth in claim 8 wherein said lips extend into the interior of said tube and said support means comprises a mandrel receivable within said tube and having rollers mounted thereon spaced longitudinally of said mandrel for engaging said lips.

9. Apparatus as set forth in claim 8 wherein said lips extend into the interior of said tube and said support means comprises a mandrel receivable within said tube and said means for engaging oppositely facing surfaces of said lips comprises a roller mounted on said mandrel and having a V-shaped peripheral groove therein for receiving said lips, said groove having a width dimension at a diameter less than the outer diameter of said roller which is less than the combined thickness of said lips, and wherein said pressure applying means comprises means opposite to said roller for pressing said lips into said groove in said roller.

10. Apparatus as set forth in claim 9 wherein said mandrel has a plurality of further rollers thereon spaced from each other longitudinally of said mandrel and disposed in advance of the weld point for engaging and supporting said lips.

11. Apparatus as set forth in claim 9 or 10 wherein said seam guide means comprises a guide roller mounted on said mandrel and receivable between said lips, said guide roller being non-conductive in the direction between its side faces.

12. Apparatus as set forth in claim 11 wherein said seam guide means comprises a pair of further rollers mounted on said mandrel in spaced relation to and respectively at opposite sides of said guide roller for engaging the interior surface of said tube adjacent to said lips.

13. Apparatus as set forth in claim 12 further comprising a hold-down roller opposed to said guide roller for engaging the exterior of said tube adjacent to said lips, said hold-down roller being non-conductive in the direction between its side faces.

14. Apparatus as set forth in claim 9 wherein said means for engaging oppositely facing surfaces of said lips comprises a roller mounted adjacent said weld point and having a V-shaped peripheral groove for receiving said lips, said groove having a width dimension at a diameter less than the outer diameter of said roller which is less than the combined thickness of said lips.

15. A method for manufacturing a tapered metal tube, said method comprising:
forming a substantially complete tube from a sheet of metal, said tube having portions adjacent to the edges of said sheet adjacent to but spaced from each other with surfaces thereof facing each other and said tube having a cross-section which varies in size in the direction of its length;
advancing said tube lengthwise thereof to bring said portions to a weld point with said surfaces thereof in spaced apart relation in advance of said weld point;
guiding said portions to the weld point by supporting said tube at said weld point by means engaging the interior of said tube at or adjacent said portions while permitting a part of said tube opposite from said portions to assume positions determined by the positions of said portions;
in advance of said weld point, supplying high frequency, electrical heating current to said tube by contacts to bring at least said surfaces of said portions to welding temperature by the time they reach the weld point, one of said contacts engaging said tube at or adjacent one of said portions and the other of said contacts engaging said tube at or adjacent the other of said portions; and
bringing said portions into contact and welding them together by pressing said surfaces of said portions together at said weld point by applying pressure to the oppositely facing surfaces of said portions which is directed transversely to said surfaces.

16. A process as set forth in claim 16 wherein in advance of said weld point, said part of said tube opposite said portions of said tube is unsupported.

17. A method as set forth in claim 1 wherein said substantially complete tube is formed with said lips extending into the interior of said tube.

* * * * *

UNITED STATES PATENT AND TRADEMARK OFFICE
CERTIFICATE OF CORRECTION

PATENT NO.  : 4,508,949
DATED       : April 2, 1985
INVENTOR(S) : Wallace C. Rudd It is certified that error appears in the above-identified patent and that said Letters Patent is hereby corrected as shown below:

Col. 1, line 39, change "the" (first occurrence) to --tube--;

Col. 2, line 13, change "advances" to --devices--;

Col. 3, line 24, after "in" insert --the diameter of--;

Col. 4, line 44, before "heating" insert --useful--;

Col. 5, line 54, change "30c" to --20c--.

Signed and Sealed this

Twenty-seventh Day of August 1985

[SEAL]

Attest:

DONALD J. QUIGG

Attesting Officer

Acting Commissioner of Patents and Trademarks